United States Patent Office 3,323,768
Patented June 6, 1967

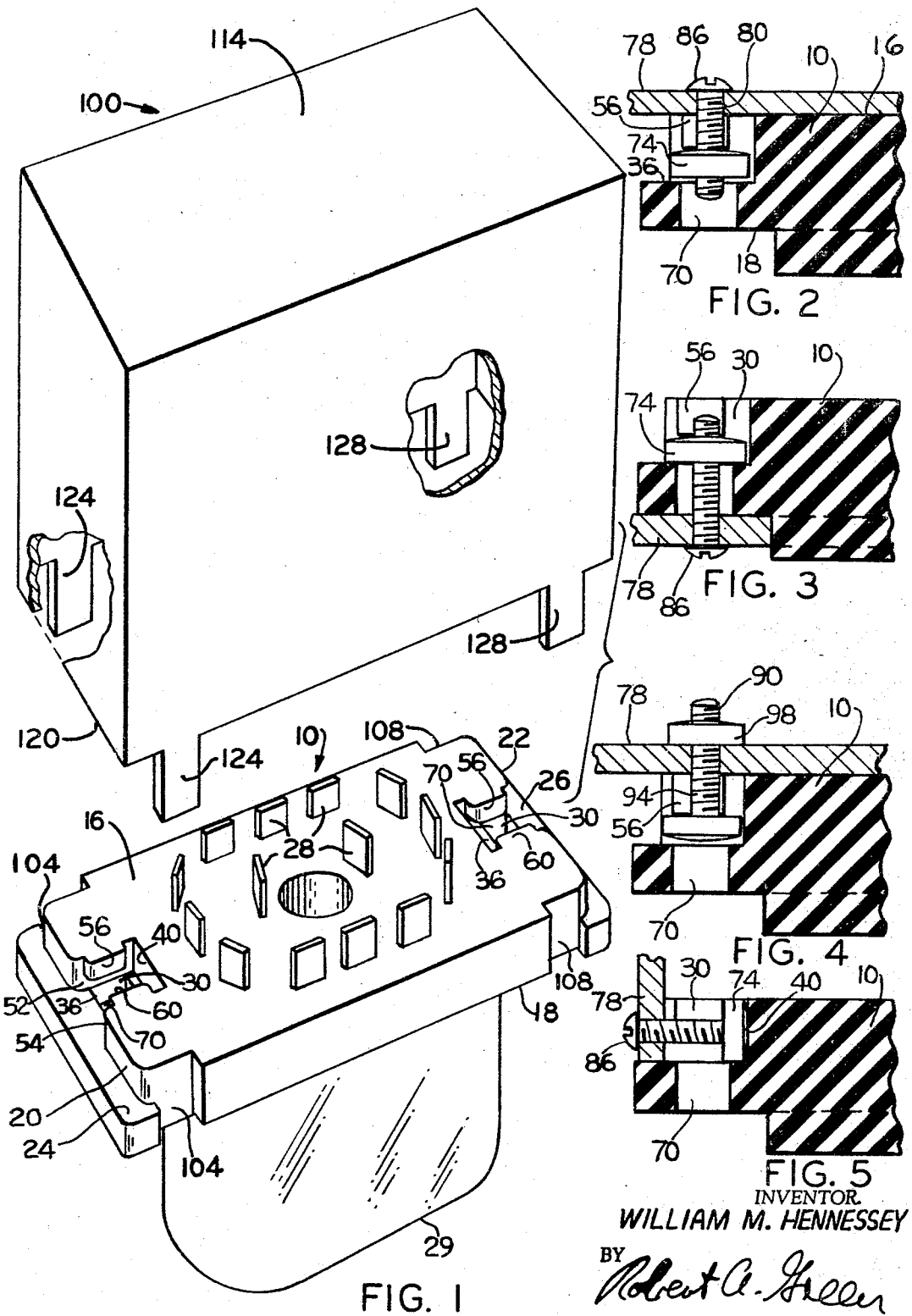

3,323,768
SOCKET AND RETAINING MEANS THEREFOR
William M. Hennessey, Roslyn, Pa., assignor to Burroughs Corporation, Detroit, Mich., a corporation of Michigan
Filed May 13, 1965, Ser. No. 455,471
6 Claims. (Cl. 248—309)

This invention relates to apparatus such as receptacles, sockets, or the like which are adapted to carry electronic components and are themselves adapted to be secured to panels, printed circuit boards, or the like.

The present invention is embodied, for purposes of illustration, in a socket of the type which is adapted to carry an electron tube or transistor or the like on one surface, and a printed circuit board and associated components on the opposite surface. Generally, such a socket is provided with one or more apertures by means of which the socket is secured to a panel or chassis. Normally, an assembler inserts a bolt through each aperture and threads a retaining nut on the bolt. In order to speed and facilitate such a mounting operation, it is desirable to have the socket carry the nut as an integral part thereof so that the assembler need only thread a mounting bolt through the captive nut.

However, a socket is generally molded of a synthetic resinous material, and, in order to prepare a socket with a nut in place, a transfer mold operation is required. This is an expansive operation, and one which is relatively difficult to automate. Compression molding and injection molding are relatively inexpensive and can be automated. However, the latter methods generally cannot be used for making a socket with a nut or other retaining means in place.

Accordingly, the objects of the invention concern the provision of an improved socket for carrying an electronic component and including an improved arrangement for holding retaining means for securing the socket to a support member.

Briefly, the socket of the invention comprises a body of synthetic resinous material which is adapted to carry an electronic or mechanical component or the like, and includes an arrangement for holding a retaining means such as a nut for use in securing the socket to a support plate. The socket is provided with an aperture designed and positioned, according to the invention, so that it is easily accessible and so that a retaining nut may be easily inserted and held in place in the aperture while the socket is secured to a support member. The aperture is arranged so that the retaining nut may be inserted and removed from at least two different directions, and it may lie in at least two different planes to allow the receptacle to be mounted on a support plate in at least two planes of orientation.

The invention is described in greater detail by reference to the drawing wherein:

FIG. 1 is a perspective view of a socket embodying the invention;

FIG. 2 is a side view, partly in section, of the socket of FIG. 1 showing one method of connecting the socket to a panel;

FIG. 3 is a side view of the socket of FIG. 1 showing another method of connecting the socket to a panel;

FIG. 4 is a view similar to that of FIG. 3 showing still another method of operating the invention; and FIG. 5 is a side view of a portion of the socket shown in FIG. 2 showing another method of connecting it to a support member.

The following description of the invention is drawn to a tube socket adapted to be secured to a support member or panel by means of one or more nut and bolt pairs. However, those skilled in the art will understand the principles embodied in this specifically described structure and will appreciate that these principles may be utilized in other related structures and devices.

Referring to the drawing, a tube socket 10 embodying the invention is of an insulating material such as a synthetic resin, is relatively thin and flat, and is generally rectangular in shape. As seen in FIG. 1, the socket includes a top surface 16, a bottom surface 18, and ends 20 and 22, from which ledges 24 and 26 extend. Since socket 10 is described as a tube socket, it is provided with the usual tube mounting means 28 oriented so that a tube 29 can be mounted on the bottom surface 18 and suitable connections may be made thereto on the top surface 16. Of course, the socket 10 may carry printed circuit boards, circuit components, or other apparatus, as desired but not shown. The socket 10 is adapted to be secured to a panel or chassis or the like by means of nut and bolt pairs secured to the opposed ends 20 and 22 of the socket. Specifically, these ends of the socket are provided, according to the invention, with means for holding a nut to which a bolt may be readily secured.

This nut-retaining means comprises a specially shaped slot or chamber 30 formed at each end of the socket so that access may be had thereto from the edges of the socket and, incidentally, from the top of the socket. Each chamber 30 is generally cubical in shape, is open on top and at the side edge of the socket, as seen in FIG. 1, and includes a horizontal bottom wall 36 (coextensive with ledges 24 and 26), a vertical rear wall 40, and two vertical side walls 52 and 54. Chamber 30 also includes two nut-retaining wall portions 56 and 60 which extend toward each other across the top of the chamber 30 to form a portion of the top wall of the chamber. The walls 56 and 60 are spaced apart sufficiently to accommodate a bolt which extends vertically between them in a manner to be described, and, preferably, they are spaced both from rear wall 40 and the imaginary front wall of the chamber opposite wall 40. This spacing of the wall portions 56 and 60 from the front end of the chamber facilitates the molding of the socket; however, this aspect of socket 10 need not be considered in detail. The spacing between these wall portions 56 and 60 and rear wall 40 provides a first space or compartment in which a nut may be positioned oriented vertically, and the spacing between these wall portions and bottom wall 36 provides a second space or compartment in which a nut may be positioned oriented horizontally.

Each chamber 30 also includes a generally rectangular slot 70 which extends completely through the body of the socket from bottom surface 36 of the chamber 30 to the bottom surface 22 of the socket. If the molding operation permits, slot 70 may have a circular cross section since it is used to accommodate a bolt which may extend generally vertically between wall portions 56 and 60 and perpendicular to the top and bottom surfaces of the socket. The slot 70 is positioned at about the center of bottom wall 36 so that a bolt may pass through it and between walls 56 and 60, if necessary. The slot 70 may be used to provide access to a nut from the direction of the top surface 16 of socket 10 or from the bottom surafce 22 of the socket.

In one mode of using the socket 10 of the invention, a nut 74 is inserted horizontally (FIG. 2) in the space or compartment between the wall portions 56 and 60 and the bottom wall 36 of each chamber 30. With the nuts thus held in place, the socket 10 is placed on a support member 78 which has apertures 80 aligned with the threaded apertures in the nuts. A bolt 86 is then inserted in the aligned apertures, and it threaded into the nut as required. It is clear that the support member 78 may engage the top surface 16 of socket 10, or it may engage bottom surface 22. If the support member 78 engages bottom surface 22, then the bolts 86 would be inserted from below as shown in FIG. 3. If desired, the bolts 86 may be replaced by studs 90 (FIG. 4) having a threaded shank 94 which extends upwardly from the socket between walls 56 and 60 and on which a nut 98 is threaded. Such alternatives are well known to those skilled in the art.

In an alternative arrangement (FIG. 5) in which the socket 10 and panel 78 are oriented perpendicularly to each other with the panel closing the open front end of chamber 30, nut 74 is inserted vertically in the space between the wall portions 56 and 60, and the back wall 40 of chamber 30. With the nut thus positioned, bolt 86 is inserted horizontally between wall portions 56 and 60, and it is threaded into nut 74.

If desired, a protective housing in the form of a rectangular tube 100 may be secured to the socket 10. The tube 100 may be provided as a protective covering for components carried by the socket 10, or it may carry circuit components itself. In order to secure the socket 10 to tube 100, the socket is provided at its ends 20 and 22 with opposed pairs of notches 104 and 108, respectively, formed as indentations in its sides. Each pair of notches is aligned with a chamber 30 so that each pair of notches and a chamber 30 may be considered to be oriented on a line extending across the width of the socket 10. The tube 100 has a closed end 114 and an open end 120, and two pairs of aligned tabs 124 and 128, the pairs being spaced from each other, extend from the open end of the tube. The socket 10 is adapted to be positioned within the open end 120 of the tube, with the walls defining the open end of the tube effectively closing the open front end of each chamber 30. Thus, assuming that a nut is oriented horizontally in each chamber 30, the nut is held in place by the wall surrounding the open end of the tube 100. With the tube and socket thus coupled together, the locking tabs 124 and 128 are bent over in the notches 104 and 108 in the socket to hold the cover member and socket locked together securely. Thus, a module is provided which may be readily mounted on a support member or panel by inserting a screw through a panel and through slot 70 to engage the nut, as shown in FIG. 2 and as described above.

Those skilled in the art will appreciate that the socket of the invention has the important advantage that nut-retaining chambers are provided which are accessible from outside the socket and permit the user to insert a nut from two different directions so that the nut can be oriented in two different planes as required. The nut-retaining chambers are so constructed that a nut, when inserted, is held captive in the chamber until the socket is secured to a panel. Those skilled in the art will appreciate that the socket of the invention can be manufactured by a relatively simple and inexpensive molding operation and with relatively simple molding tools.

I claim:
1. A mounting member for a component including
a relatively thin, flat body adapted to be secured to a support member,
said body having at least one chamber including a first wall and a second wall,
said chamber also including a barrier member spaced from said first wall to provide a first recess for receiving a retaining member in horizontal orientation and spaced from said second wall to provide a second recess for receiving a retaining member in vertical orientation,
said retaining member being adapted to be secured to said support member.
2. The member defined in claim 1 wherein said chamber includes two auxiliary walls rising from said first wall and connected to said second wall and said barrier member comprises two wall portions which arise from said two auxiliary walls and extend toward each other.
3. The member defined in claim 1 wherein
said first wall is a bottom wall and said second wall is a back wall and including first and second side walls rising from said bottom wall, and
said barrier member includes a first barrier rising from said first side wall parallel to said bottom wall and a second barrier rising from said second wall parallel to said bottom wall, said first and second barriers extending toward but spaced from each other.
4. The member defined in claim 1 wherein
said first wall is a bottom wall and said second wall is a back wall and including first and second side walls rising from said bottom wall,
said barrier member including a first barrier rising from said first side wall parallel to said bottom wall and a second barrier rising from said second wall parallel to said bottom wall, said first and second barriers extending toward but spaced from each other, and
said bottom wall includes an aperture for receiving an auxiliary fastener means for engaging said retaining member.
5. An electronic module comprising
a relatively thin, flat, rectangular body of synthetic resinous material which is adapted to be secured at opposed ends to a support member,
said body having top and bottom surfaces and portions which are adapted to support various circuit components,
a chamber present in said body at each of said opposed ends and accessible from outside said body, each chamber being adapted to receive and hold in place retaining means for use in securing said body to a support member,
each chamber being generally cubical in shape and extending downwardly from the top surface of said body and inwardly from the edge of the body and having a bottom wall, a back wall, and two side walls, the top and front of each chamber being open,
each chamber also including a pair of narrow wall members extending across the top of the chamber from each side wall,
said narrow wall members being spaced from the back wall by an amount sufficient to provide a vertical compartment adapted to receive a retaining means,
said narrow wall members being spaced from the bottom wall by an amount sufficient to provide a horizontal compartment for receiving a retaining means,
said narrow wall members being spaced from each other by an amount sufficient to accommodate between them means for engaging a retaining means positioned in said horizontal compartment.
6. The module defined in claim 5 and including a slot which extends from the bottom surface of the body into each chamber through the bottom wall of the chamber whereby means may be inserted from outside the socket to engage retaining means held in the chamber.

References Cited

UNITED STATES PATENTS 1,689,511 10/1928 Wise et al. _____ 339—119
2,448,389 8/1948 Powell _____ 339—126
3,201,786 8/1965 Andersen et al. _____ 42—17

JOHN PETO, *Primary Examiner.*

ROBERT K. SCHAEFER, *Examiner.*

J. F. FOSS, W. C. GARVERT, *Assistant Examiners.*